(12) United States Patent
Schiessl

(10) Patent No.: US 10,794,224 B2
(45) Date of Patent: Oct. 6, 2020

(54) GAS TURBINE AND METHOD OF ATTACHING A TURBINE NOZZLE GUIDE VANE SEGMENT OF A GAS TURBINE

(71) Applicant: Rolls-Royce Deutschland Ltd & Co KG, Blankenfelde-Mahlow (DE)

(72) Inventor: Thomas Schiessl, Rangsdorf (DE)

(73) Assignee: ROLLS-ROYCE DEUTSCHLAND LTD & CO KG, Blankenfelde-Mahlow (DE)

(*) Notice: Subject to any disclaimer, the term of this patent is extended or adjusted under 35 U.S.C. 154(b) by 565 days.

(21) Appl. No.: 15/682,034

(22) Filed: Aug. 21, 2017

(65) Prior Publication Data
US 2018/0058262 A1 Mar. 1, 2018

(30) Foreign Application Priority Data
Aug. 23, 2016 (DE) .................. 10 2016 115 610

(51) Int. Cl.
*F01D 25/24* (2006.01)
*F01D 9/04* (2006.01)
*F02C 3/04* (2006.01)

(52) U.S. Cl.
CPC ........... *F01D 25/246* (2013.01); *F01D 9/041* (2013.01); *F02C 3/04* (2013.01); *F05D 2220/32* (2013.01); *F05D 2220/3212* (2013.01); *F05D 2240/11* (2013.01); *F05D 2240/12* (2013.01)

(58) Field of Classification Search
CPC ...... F01D 25/246; F01D 25/243; F01D 25/24; F01D 25/26; F01D 25/28
USPC .................................................... 415/209.2
See application file for complete search history.

(56) References Cited

U.S. PATENT DOCUMENTS

| 2,488,867 A | 11/1949 | Judson |
| 3,620,641 A | 11/1971 | Keen et al. |
| 3,623,736 A * | 11/1971 | Petrie .................... F01D 11/025 277/422 |

(Continued)

FOREIGN PATENT DOCUMENTS

| DE | 3541606 A1 | 6/1986 |
| DE | 102005045459 A1 | 4/2006 |

(Continued)

OTHER PUBLICATIONS

German Search Report dated May 2, 2017 for counterpart German Application No. 10 2016 115 610.8.

(Continued)

*Primary Examiner* — Moshe Wilenksy
*Assistant Examiner* — Jason Mikus
(74) *Attorney, Agent, or Firm* — Shuttleworth & Ingersoll, PLC; Timothy J. Klima

(57) ABSTRACT

A gas turbine, including: a combustion chamber; a high-pressure turbine with a first turbine guide vane ring that is arranged downstream of the combustion chamber, wherein the first turbine guide vane ring has a plurality of turbine nozzle guide vane segments that respectively include at least one guide vane, an outer platform, and an inner platform; and an outer housing. Provision is made that the turbine nozzle guide vane segments are fixed in the radial direction at the outer housing, wherein occurring radial loads are transferred into the outer housing. The invention further relates to a method for attaching a turbine nozzle guide vane segment of a gas turbine.

15 Claims, 9 Drawing Sheets

(56) References Cited

U.S. PATENT DOCUMENTS

| | | | |
|---|---|---|---|
| 4,300,868 A | | 11/1981 | Wilkinson et al. |
| 4,391,565 A | | 7/1983 | Speak |
| 4,522,557 A | | 6/1985 | Bouiller et al. |
| 4,720,236 A | * | 1/1988 | Stevens .................. F01D 9/042 415/116 |
| 5,129,783 A | | 7/1992 | Hayton |
| 6,425,738 B1 | | 7/2002 | Shaw |
| 7,160,078 B2 | * | 1/2007 | Coign ..................... F01D 9/041 29/889.22 |
| 8,038,389 B2 | | 10/2011 | Arness et al. |
| 9,188,062 B2 | | 11/2015 | Tsutsumi |
| 2008/0080970 A1 | | 4/2008 | Cooke et al. |
| 2009/0129917 A1 | | 5/2009 | Hazevis et al. |

FOREIGN PATENT DOCUMENTS

| | | |
|---|---|---|
| DE | 102007001459 A1 | 7/2007 |
| DE | 112012006864 T5 | 5/2015 |
| EP | 2278125 A2 | 1/2011 |

OTHER PUBLICATIONS

European Search Report dated Jan. 30, 2018 from counterpart European App No. 17187224.5.

\* cited by examiner

GAS TURBINE AND METHOD OF ATTACHING A TURBINE NOZZLE GUIDE VANE SEGMENT OF A GAS TURBINE

REFERENCE TO RELATED APPLICATION

This application claims priority to German Patent Application No. 10 2016 115 610.8 filed on Aug. 23, 2016, the entirety of which is incorporated by reference herein.

BACKGROUND

The invention relates to a gas turbine and to a method for attaching a turbine nozzle guide vane segment of a gas turbine.

It is known to fix the turbine nozzle guide vane segments of the stage 1, which form the first guide vane ring of the high-pressure turbine of a gas turbine that is arranged downstream of the combustion chamber, at the combustion chamber inner casing in the radial direction and in the circumferential direction, thus at a structure that is located radially inside with respect to the main flow path through the gas turbine. As a result, the turbine nozzle guide vane segments have to be suspended with a relatively large radial play with respect to the casing of the high-pressure turbine, at which the adjoining structures of the high-pressure turbine are formed or arranged, delimiting the main flow path in this area radially outside together with the turbine nozzle guide vane segments. Thus, a long tolerance chain results due to the fixation of the turbine nozzle guide vane segments at the combustion chamber inner casing, leading via the combustion chamber inner casing and a high-pressure compressor exit nozzle ring with a diffusor to the combustion chamber outer casing and from there to the casing of the high-pressure turbine. This tolerance chain and differing thermal expansions lead to radial relative movements at the radially outer boundary of the main flow path, for which a corresponding installation space has to be provided.

In the case that the rotor blade ring arranged downstream of the turbine guide vane ring has rotor blades that are formed without a tip shroud, there is the associated problem that at the radially outer boundary of the main flow path, between the turbine nozzle guide vane segments and a radially outer boundary of the main flow path that is fixed at the casing of the high-pressure turbine, a step is present that can be optimized only for one operating point and in addition is subject to the mentioned relatively long tolerance chain.

The invention is based on the objective of providing a gas turbine and a method for attaching a turbine nozzle guide vane segment of a gas turbine, by means of which the high tolerances as well as the differing radial thermal expansions or resulting displacements between the guide vane ring of stage 1 and adjoining structures, as they have been existing so far, can be reduced.

SUMMARY

An embodiment of the invention relates to a gas turbine that has a combustion chamber as well as a high-pressure turbine with a first turbine guide vane ring that is arranged downstream of the combustion chamber. The turbine guide vane ring has a plurality of turbine nozzle guide vane segments which respectively comprise at least one guide vane, an inner platform, and an outer platform. Further, the gas turbine has an outer housing. Provision is made that the turbine nozzle guide vane segments are fixed in the radial direction at the outer housing, with any occurring radial loads being transferred into the outer housing.

Aspects of the invention are thus based on the idea to fix the turbine nozzle guide vane segments not at the combustion chamber inner casing, but instead at an outer housing of the gas turbine in the radial direction. Radial forces are correspondingly guided directly into the outer housing. In this manner, thermal relative movements and tolerances at the radially outer boundary of the main flow path are reduced to a minimum through the gas turbine. For, according to the invention, the turbine nozzle guide vane segments and the adjoining components and structures of the high-pressure turbine in the main flow path are fixed in the radial direction at the same structure, namely at the outer housing.

A further advantage associated with the invention is that an installation space in the rim area of a turbine disc can be obtained, which supports the rotor blades of stage 1 of the high-pressure turbine and is arranged at a small axial distance to the inner platform of the turbine nozzle guide vane segments. For, the radial fixation of the turbine nozzle guide vane segments at the combustion chamber inner casing, as it is known from the state of the art, has been realized through structures in the area of the inner platform of the turbine nozzle guide vane segments. Such an additional installation space can for example be used to provide pre-swirl nozzles for cooling the turbine disc.

The outer housing of the gas turbine at which the turbine nozzle guide vane segments are fixed can be formed by a turbine casing of the high-pressure turbine and a combustion chamber outer casing of the combustion chamber that are connected to one another, wherein the turbine nozzle guide vane segments are fixed at the turbine casing or at the combustion chamber outer casing.

According to one embodiment of the invention, provision is made that the turbine nozzle guide vane segments are supported in the axial direction at the outer casing of the high-pressure turbine as well as at a combustion chamber inner casing of the combustion chamber, wherein occurring axial loads are guided into the outer housing as well as into the combustion chamber inner casing. Correspondingly, only the fixation of the turbine nozzle guide vane segments in the radial direction (and possibly in the circumferential direction, as will be explained in the following) is realized only at the outer housing. In contrast, the fixation of the turbine nozzle guide vane segments in the axial direction, which is realized separately of the radial fixation, is realized at the structures of the outer housing (or at structures that are connected to the outer housing) and also at structures of the combustion chamber inner casing (or at structures that are connected to the combustion chamber inner casing).

Here, the fixation in the axial direction is realized for example by a support, i.e. an axially adjoining element that prevents any axial movement. Alternatively, an axial fixation can for example be realized by means of a groove-finger connection.

Thus, according to this exemplary embodiment, any occurring axial loads are diverted into the outer housing as well as into the combustion chamber inner casing. This is associated with the advantage that axial loads are distributed better.

In a further embodiment of the invention, provision is made that, at its inner platform, a turbine nozzle guide vane segment forms a structure that extends in the radial direction inwards and that comprises a sealing edge that extends in the circumferential direction, wherein the structure extending inwards in the radial direction is arranged inside a recess of a structure of the combustion chamber inner casing that extends in the radial direction and that is arranged so as to be displaceable inside the same in the radial direction, wherein the recess that extends in the radial direction forms an axial stop collar of the combustion chamber inner casing for the sealing edge of the structure, and thus for the turbine nozzle guide vane segment. In this embodiment, it is ensured that, for one thing, the turbine nozzle guide vane segments that are fixed in the radial direction at the outer housing, can be radially displaced with respect to the combustion chamber inner casing, so that radial tolerances that are still present can be accommodated. On the other hand, through this embodiment, an axial stop collar for the axial support of the turbine nozzle guide vane segments with respect to the combustion chamber inner casing is provided in a simple manner.

In a further embodiment, provision is made that, at its outer platform, a turbine nozzle guide vane segment is axially supported at a structure which provides the outer boundary of the main flow path for the rotor blades of a first turbine guide vane ring that is arranged downstream of the first turbine guide vane ring. This structure can for example be a shroud segment that provides towards the main flow path an abradable coating for the rotor blades of the first turbine blade ring which is arranged downstream of the first turbine guide vane ring.

Here, it can be provided that, at its outer platform, a turbine nozzle guide vane segment forms a structure that extends outwards in the radial direction and that has a sealing edge that extends in the circumferential direction and is axially supported. The sealing edge can for example be supported at the just mentioned structure, or alternatively at a structure of the outer housing, or alternatively at a support ring that is connected to the outer housing.

For fixing the turbine nozzle guide vane segments in the radial direction, it can be provided that the guide vane segments are respectively fixed at the outer housing by means of at least one pin, in particular two pins or bolts. Here, it can be provided that the one pin is arranged inside a circular hole and the other pin is arranged inside an elongated hole. Here, the connection via the elongated hole provides a fixation only in the radial direction. The connection via the circular hole additionally provides a fixation of the turbine nozzle guide vane segment also in the circumferential direction.

Thus, provision is made according to one embodiment of the invention that the turbine nozzle guide vane segments are fixed in the radial direction and in the circumferential direction at the outer housing, wherein occurring radial and tangential loads are guided into the outer housing. Here, it can be provided that the same fixation means are at least partially used for the radial fixation as well as for the fixation in the circumferential direction. As just mentioned, this fixation means may for example be a circular hole that is formed in a wall of the outer platform of the turbine nozzle guide vane segment and inside of which a pin is arranged that is mounted in the outer housing.

For fixing the turbine nozzle guide vane segment in the radial direction at the outer housing, it can alternatively be provided that the turbine nozzle guide vane segments are respectively fixed in the radial direction inside an axial groove in the outer housing by means of at least one hook. A fixation in the circumferential direction can also be realized through one or multiple pins.

At that, provision is made in one embodiment that the turbine nozzle guide vane segments are fixed in the radial direction directly at the turbine housing respectively by means of at least one hook. For this purpose, the hooks are arranged respectively inside an axial groove of the turbine casing, for example.

Further, it can be provided that the mentioned groove of the turbine casing further serves for the radial fixation of a structure that is arranged downstream of the first turbine guide vane ring and provides the outer boundary of the main flow path for the rotor blades of a first turbine blade ring arranged downstream of the first turbine guide vane ring. This structure forms a shroud segment of the outer main flow path boundary, for example.

In the case that a turbine nozzle guide vane segment is fixed in the radial direction respectively by means of at least one hook, a fixation of the turbine nozzle guide vane segment in the circumferential direction can be realized my means of one or multiple pins. The mentioned structure, which is arranged downstream of the first turbine guide vane ring and provides the outer boundary of the main flow path for the rotor blades of a first turbine blade ring that is arranged downstream of the first turbine guide vane ring, can be supported in the circumferential direction at the lateral surfaces of the hooks of the turbine nozzle guide vane segment.

In general, the means (pins, hooks) for fixing the turbine nozzle guide vane segments in the radial direction at the outer housing can be formed at a structure that extends outwards at the outer platform in the radial direction.

According to one embodiment of the invention, provision is made that the turbine nozzle guide vane segments are fixed in the radial direction directly at the outer housing. However, this is not necessarily the case. Thus, it can be provided in alternative embodiments that the turbine nozzle guide vane segments are radially fixed at the outer housing by means of an intermediate structure. This may for example be advantageous with respect to constructional specifications or assembly requirements.

In a first embodiment variant to that, provision is made that the intermediate structure is formed by a guide vane support ring at which the turbine nozzle guide vane segments are radially fixed. Here, the guide vane support ring is connected to the turbine casing.

Here, it can be provided according to one embodiment variant that the guide vane support ring has a wall area that is provided with axially extending slits. In this manner, it can be ensured that the guide vane support ring maintains a connection to the outer housing under all operational conditions, and that the radial relative movements between the guide vane and neighboring structures are minimized. Thus, through such a guide vane support ring provided with slits, it can for example be achieved that the thermal movements of the outer housing are not obstructed by a support ring which is formed as a full ring without any such slits.

In one embodiment variant to this, provision is made that a radial area of the guide vane support ring is fixed radially between the outer housing and a structure that adjoins the turbine nozzle guide vane segment in the axial direction. For example, the outer housing and the mentioned structure form a groove into which a radial area of the guide vane support ring meshes, thus forming a groove-finger connection. In this manner, a radial fixation of the guide vane support ring at the outer housing can be provided, whereby radial relative movements between the turbine nozzle guide vane segment and the structure adjoining it in the axial direction can be minimized.

Alternatively, it can be provided that the guide vane support ring is formed without slits. At that, radial relative movements between the guide vane and neighboring structures are still more controlled and have smaller deflections as compared to a radial fixation of the turbine nozzle guide vane segments at the combustion chamber inner casing according to the state of the art.

In a second embodiment variant for providing an intermediate structure, provision is made that the intermediate structure has a combustion chamber support ring by means of which the intermediate structure is additionally connected to the combustion chamber, in particular to the outer combustion chamber wall. In this way, a fixation and attachment of the combustion chamber can be provided in a simple manner. Here, it can be provided that the combustion chamber support ring also has a wall area that is provided with axially extending slits.

In all mentioned embodiment variants, it can be provided that the intermediate structure forms a heat shield that provides shielding against the high temperatures which the gases have in the main flow path directly behind the combustion chamber.

The present invention provides an attachment of turbine nozzle guide vane segments independently of the manner in which the rotor blade ring of stage 1 following the turbine guide vane ring in the flow direction is formed. In principle, this rotor blade ring can be realized in an embodiment with a tip shroud as well as in an embodiment without a tip shroud. In one embodiment of the invention, provision is made that the rotor blades of the rotor blade ring arranged downstream of the first turbine guide vane ring is formed without a tip shroud. Particularly in such an embodiment, there is the danger that a radial step is formed between the turbine guide vane ring and the structure adjoining it in the axial direction, which provides abradable coating towards the main flow path. Through such an abradable coating, the gap of the blade tips to the outer boundary of the main flow path can be minimized.

According to a further aspect of the invention, the invention relates to a method for attaching a turbine nozzle guide vane segment of a gas turbine, wherein the gas turbine has a combustion chamber, a high-pressure turbine with a first turbine guide vane ring arranged downstream of the combustion chamber, and an outer housing. The method comprises:
    fixing a turbine nozzle guide vane segment in the radial direction at the outer housing,
    fixing the turbine nozzle guide vane segment in the circumferential direction also at the outer housing, and
    fixing the turbine nozzle guide vane segment in the axial direction at the outer housing as well as at a combustion chamber inner casing of the gas turbine.

Here, provision is made in one embodiment that the fixation in the radial direction and the fixation in the circumferential direction is performed at least partially by means of the same fixation means.

BRIEF DESCRIPTION OF THE DRAWINGS

The invention will be explained in more detail on the basis of exemplary embodiments with reference to the accompanying drawings in which.

DETAILED DESCRIPTION

Figure 1:
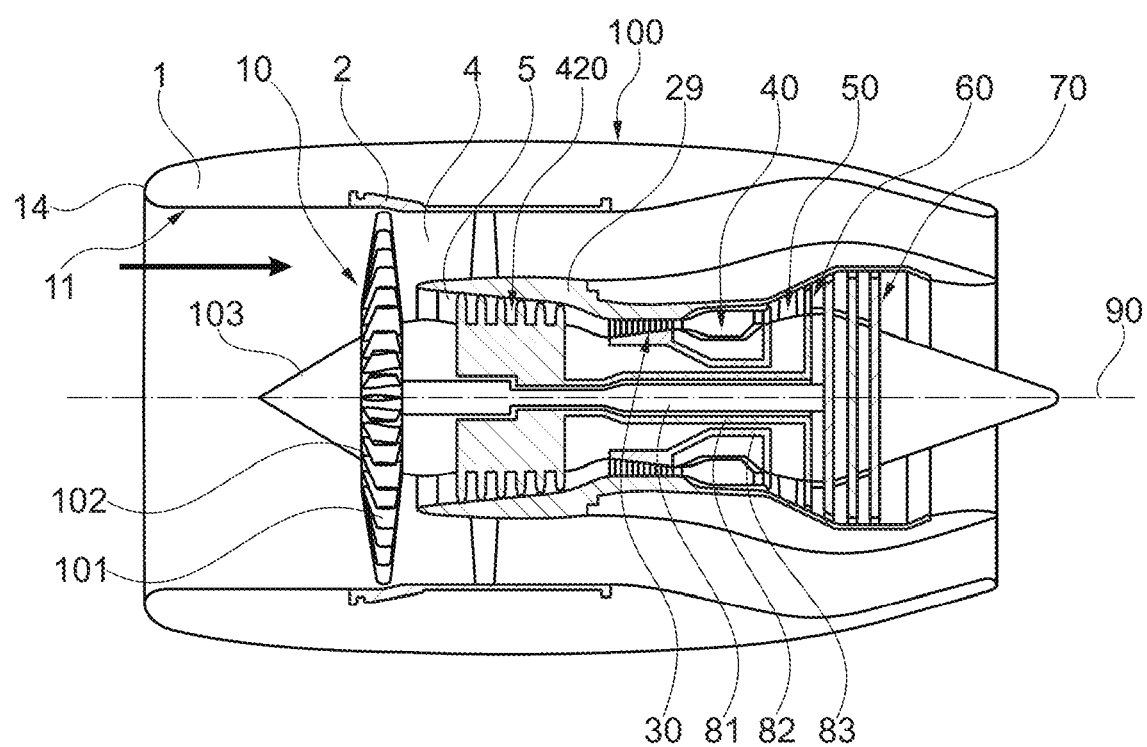
FIG. 1 shows a simplified schematic sectional view of a turbofan engine in which the present invention can be realized.

FIG. 1 shows, in a schematic manner, a turbofan engine 100 that has a fan stage with a fan 10 as the low-pressure compressor, an intermediate-pressure compressor 420, a high-pressure compressor 30, a combustion chamber 40, a high-pressure turbine 50, an intermediate-pressure turbine 60, and a low-pressure turbine 70.

The intermediate-pressure compressor 420 and the high-pressure compressor 30 respectively have a plurality of compressor stages that respectively comprise a rotor stage and a stator stage. The turbofan engine 100 of FIG. 1 further has three separate shafts, a low-pressure shaft 81 that connects the low-pressure turbine 70 to the fan 10, a intermediate-pressure shaft 82 that connects the intermediate-pressure turbine 60 to the intermediate-pressure compressor 420, and a high-pressure shaft 83 that connects the high-pressure turbine 50 to the high-pressure compressor 30. However, this is to be understood to be merely an example. If, for example, the turbofan engine has no intermediate-pressure compressor and no intermediate-pressure turbine, only a low-pressure shaft and a high-pressure shaft would be present.

The turbofan engine 100 has an engine nacelle 1 that comprises an inlet lip 14 and forms an engine inlet 11 at the inner side, supplying inflowing air to the fan 10. The fan 10 has a plurality of fan blades 101 that are connected to a fan disc 102. Here, the annulus of the fan disc 102 forms the radially inner boundary of the flow path through the fan 10. Radially outside, the flow path is delimited by the fan casing 2. Upstream of the fan-disc 102, a nose cone 103 is arranged.

Behind the fan 10, the turbofan engine 100 forms a secondary flow channel 4 and a primary flow channel 5. The primary flow channel 5 leads through the core engine (gas turbine) that comprises the intermediate-pressure compressor 20, the high-pressure compressor 30, the combustion chamber 40, the high-pressure turbine 50, the intermediate-pressure turbine 60, and the low-pressure turbine 70. At that, the intermediate-pressure compressor 20 and the high-pressure compressor 30 are surrounded by a circumferential housing 29 which forms an annulus surface at the internal side, delimitating the primary flow channel 5 radially outside. Radially inside, the primary flow channel 5 is delimitated by corresponding rim surfaces of the rotors and stators of the respective compressor stages, or by the hub or by elements of the corresponding drive shaft connected to the hub.

During operation of the turbofan engine 100, a primary flow flows through the primary flow channel 5 (also referred to as the main flow channel in the following). The secondary flow channel 4, which is also referred to as the partial-flow channel, sheath flow channel, or bypass channel, guides air sucked in by the fan 10 during operation of the turbofan engine 100 past the core engine.

The described components have a common symmetry axis 90. The symmetry axis 90 defines an axial direction of the turbofan engine. A radial direction of the turbofan engine extends perpendicularly to the axial direction.

In the context of the present invention, the configuration of the high-pressure turbine 50, in particular of the first stage of the high-pressure turbine 50, is of importance.

Figure 2A:
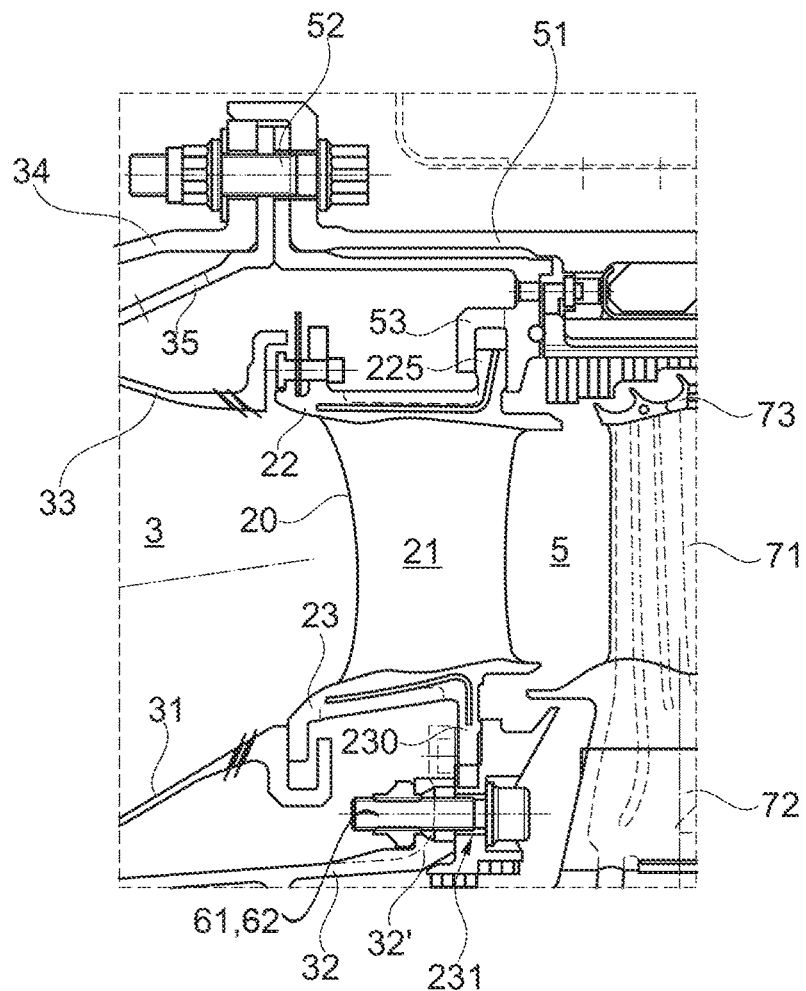
FIG. 2a shows a rendering of a turbine nozzle guide vane segment of a guide vane ring of stage 1 of a high-pressure turbine according to the state of the art, which is realized so as to be adjoining the combustion chamber in the main flow path.
Figure 2B:
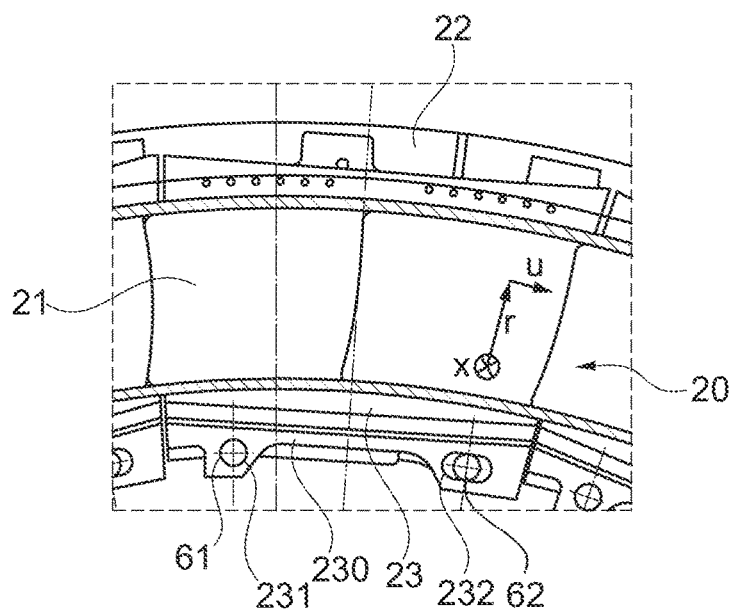
FIG. 2b shows a rendering of the radial fixation of the turbine nozzle guide vane segment of FIG. 2a, in the area of its inner platform, at a combustion chamber inner casing by means of two pins.

At first, the suspension of turbine nozzle guide vane segments according to the state of the art is described based on FIGS. 2a and 2b to provide a better understanding of the present invention.

FIG. 2a shows a partial section of a main flow path 5 through a gas turbine that is part of an aircraft engine. The shown partial section illustrates the—with respect to the flow direction—rear section of a combustion chamber 3, a turbine nozzle guide vane segment 20 of a turbine guide vane ring that is arranged directly downstream of the combustion chamber 3, and a rotor blade 71 of a turbine blade ring. Here, the guide vane ring and the rotor blade ring form the first stage of the high-pressure turbine.

The combustion chamber 3 has a radially inner combustion chamber wall 31 and a radially outer combustion chamber wall 33. Structurally, the combustion chamber 3 is supported by a combustion chamber inner casing 32 and a combustion chamber outer casing 34. Here, the radially outer combustion chamber wall 33 is connected via a wall 35 to the combustion chamber outer casing 34. In a corresponding manner, the radially inner combustion chamber wall 31 is connected to the combustion chamber inner casing 32 via a wall (not shown).

The combustion chamber outer casing 34 is connected to the casing 51 of the high-pressure turbine in a connection area 52, for example by means of bolts. The casing 51 of the high-pressure turbine is an outer housing.

The turbine nozzle guide vane segment 20 comprises a guide vane 21, an outer platform 22 that delimits the main flow path 5 radially outside, and an inner platform 23 that delimits the main flow path 5 radially inside. Here, a segment 20 can have one or multiple guide vanes 21. Together, the segments 20 that are arranged next to each other in the circumferential direction form the turbine guide vane ring of the first stage of the high-pressure turbine.

The rotor blades 71 are arranged at a turbine disc 72 at a distance to each other in the circumferential direction. At their radially outer ends, they are provided with a tip shroud 73. The rotor blades 71 form a rotor blade ring of the first stage of the high-pressure turbine.

The turbine nozzle guide vane segments 20 are fixed at the combustion chamber inner casing 32 with respect to the radial direction. For this purpose, the inner platform 23 of the segment 20 forms a substantially radially extending wall 230 that [is] fixed at a structure 32', which is a part of the combustion chamber inner casing 32, by means of two pins 61, 62. The type of this radial fixation can be seen in FIG. 2b, in which a view from the front onto the turbine nozzle guide vane segment 20 is shown. Accordingly, in the shown exemplary embodiment, the segment 20 has two guide vanes 21 that extend radially between the outer platform 22 and the inner platform 23. The circumferential direction is indicated by u, the radial direction by r, and the axial direction by x.

According to FIG. 2b, the inner platform 23 forms a circular hole 231, on the one hand, and an extended hole 232, on the other, in the area of the wall 230. Respectively one pin 61, 62, which is fixed in the structure 32', is inserted into the circular hole 231 and the extended hole 232. By means of the pin 62 and the extended hole 232, the segment 20 is fixed only in the radial direction r. By means of the pin 61 and the circular hole 231, the segment 20 is fixed in the radial direction r as well as in the circumferential direction u. A fixation in the axial direction is realized neither by means of the pin 61 nor the pin 62.

In contrast, a fixation in the axial direction is realized through contact surfaces at axially neighboring structures. For example, at the outer platform 22, the segment 20 forms a wall 225 that extends in the radial direction and that is axially supported in a groove-like structure 53 of the turbine casing 51 of the high-pressure turbine and is arranged so as to be movable in the radial direction. The movability in the radial direction makes it possible to prevent constraint forces that are generated by tolerances or different thermal expansions. Here, the occurring tolerances can be relatively strong, since a long tolerance chain results due to the fixation of the turbine nozzle guide vane segments 20 at the combustion chamber inner casing 32, leading via the combustion chamber inner casing 32 and the radial supports, e.g. a compressor exit nozzle ring (not shown), to the combustion chamber outer casing 34, and from there to the turbine casing 51 of the high-pressure turbine.

A further disadvantage of the embodiment described in FIGS. 2a, 2b is that, when it comes to concepts of rotor blades 71 that, in contrast to the ones shown in FIG. 2a, are formed without a tip shroud, a radial step is present at the radially outer boundary of the main flow path 5, which can be optimized for only one operating point and in addition is subject to a relatively long tolerance chain. In constructions where a precise circumferential position of the turbine nozzle guide vane segments 20 relative to the combustion chamber 3 or other structures of the high-pressure turbine is of crucial importance, the relatively long tolerance chain is also disadvantageous. The aerodynamic forces in the circumferential direction have to be absorbed via the combustion chamber inner casing 32 and e.g. a compressor exit nozzle ring into the outer housing 34, 51, which has to be taken into account when designing these components. After all, especially with smaller engines, the installation space in the rim area of the turbine disc 72 is restricted through the internal attachment with the components 230, 231, 232, 61, 62, and renders any additional cooling of the turbine disc 72, as it may possibly be necessary, impossible.

Figure 3A:
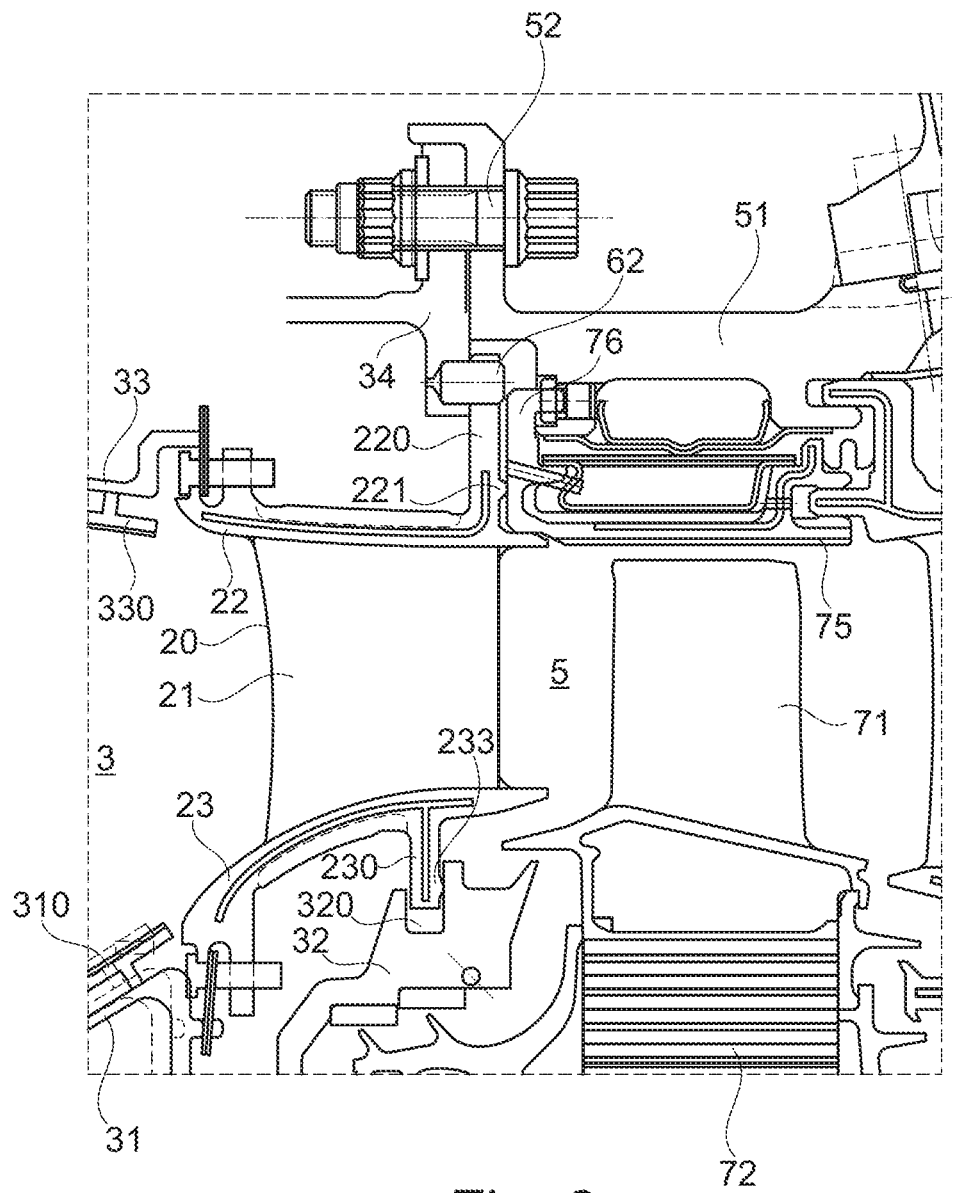
FIG. 3a shows a first exemplary embodiment of a turbine nozzle guide vane segment of a nozzle guide vane ring of stage 1 of a high-pressure turbine, wherein the turbine nozzle guide vane segment is radially fixed directly at a combustion chamber outer casing.

FIG. 3*a* shows a first exemplary embodiment of the arrangement of the turbine nozzle guide vane segments 20 in the core engine. Like FIG. 2, FIG. 3 shows a partial section that comprises the rear area of a combustion chamber 3, a turbine nozzle guide vane segment 20 of a guide vane ring, and a rotor blade 71 of a rotor blade ring. The combustion chamber 3 comprises a combustion chamber inner wall 31 and a combustion chamber outer wall 33.

The combustion chamber inner wall 31 is clad with heat shingles 310, and the combustion chamber outer wall 33 is clad with heat shingles 330. Structurally, the combustion chamber 3 is supported by a combustion chamber inner casing 32 and a combustion chamber outer casing 34, in a comparable manner as the one described with regard to FIG. 2*a*.

Each turbine nozzle guide vane segment 20 comprises one or multiple guide vanes 21, an outer platform 22, and an inner platform 23. The inner platform 23 forms a wall section 230 that extends in the radial direction and meshes with the recess 320 (e.g. a groove) of a wall of the combustion chamber inner casing 32, which also extends in the radial direction. The wall section 230 forms a sealing edge 233 that extends in the circumferential direction. Here, the recess 320 that extends in the radial direction forms an axial stop collar for the sealing edge 233, and thus for the turbine nozzle guide vane segment 20. The wall section 230 is not fixed in the radial direction with respect to the wall 32.

The outer platform 22 comprises a wall section 220 that extends in the radial direction. It is directly connected to the combustion chamber outer casing 34 by means of two pins 61, 62. Here, the connection is realized via a circular hole and an extended hole corresponding to the rendering of FIG. 2*b*. Thus, the embodiments of FIG. 2*b* may be referred to here.

The combustion chamber outer casing 34 forms a part of the outer housing of the gas turbine, which is formed by the combustion chamber outer casing 34 and the turbine casing 51 of the high-pressure turbine, wherein the combustion chamber outer casing 34 and the turbine casing 51 are connected to each other in the connection area 52, for example by means of bolts. In alternative embodiments, the outer platform 22 is directly connected to the turbine casing 51 of the high-pressure turbine.

It is to be understood that the turbine nozzle guide vane segment 20 is also fixed in the circumferential direction through the connection of the circular hole and the pin.

For an axial fixation of the turbine nozzle guide vane segment 20 in the area of the upper platform 22 and thus radially outside with respect to the main flow path 5, the wall section 220 forms a contact surface in the form of sealing edge 221 that extends in the circumferential direction and is axially supported at a wall 76 of an adjoining structure. This structure may for example be a structure that is connected to the turbine casing 51 of the high-pressure turbine and that serves for receiving an abradable material 75 that is formed by the structure towards the main flow path 5. Thus, provision is made in the embodiment of FIG. 3 that the rotor blades 71 of the rotor blade ring of the first stage of the high-pressure turbine are formed without a tip shroud, so that the blade tips are arranged across from the outer flow path boundary with a gap separating them from the same. This gap can be minimized by providing an abradable material 75, into which the blade tips can work themselves in. The adjoining structure 76 is also referred to as a shroud segment of the outer main flow path boundary.

The individual rotor blades 71 are arranged at the outer circumference of a turbine disc 72.

Figure 3B:
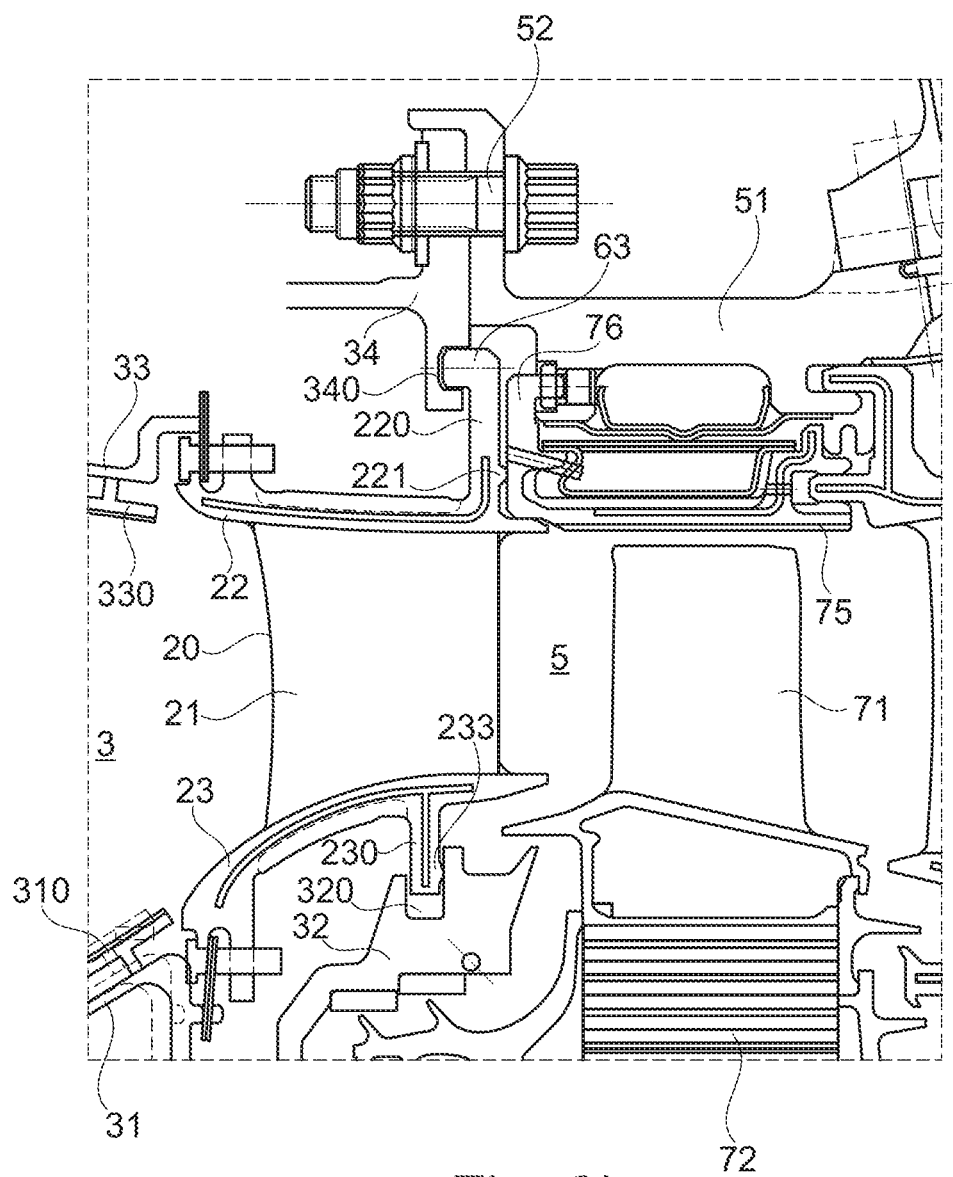
FIG. 3b shows a second exemplary embodiment of a turbine nozzle guide vane segment of a nozzle guide vane ring of stage 1 of a high-pressure turbine, wherein the turbine nozzle guide vane segment is also radially fixed directly at a combustion chamber outer casing.

FIG. 3*b* shows an exemplary embodiment that corresponds to the exemplary embodiment of FIG. 3*a*, except for the type of radial fixation of the turbine nozzle guide vane segments 20 at the outer housing. Thus, provision is made in the exemplary embodiment of FIG. 3*b* that the turbine nozzle guide vane segments 20 are fixed in the radial direction inside an axial groove 340 in the combustion chamber outer casing 34 that extends about the circumferential direction respectively by means of the at least one hook 63 that is formed at the wall section 220 of the outer platform 22 extending in the radial direction. Here, two hooks 63 per turbine nozzle guide vane segment 20 are provided, for example. Alternatively, a hook 63 that is continuous in the circumferential direction can be provided.

In this embodiment, a fixation of a turbine nozzle guide vane segment 20 in the circumferential direction can be realized by means of one or multiple axial pins. For example, one pin is inserted into an axial slot that is formed by one of the hooks 63 (not shown).

Figure 3C:
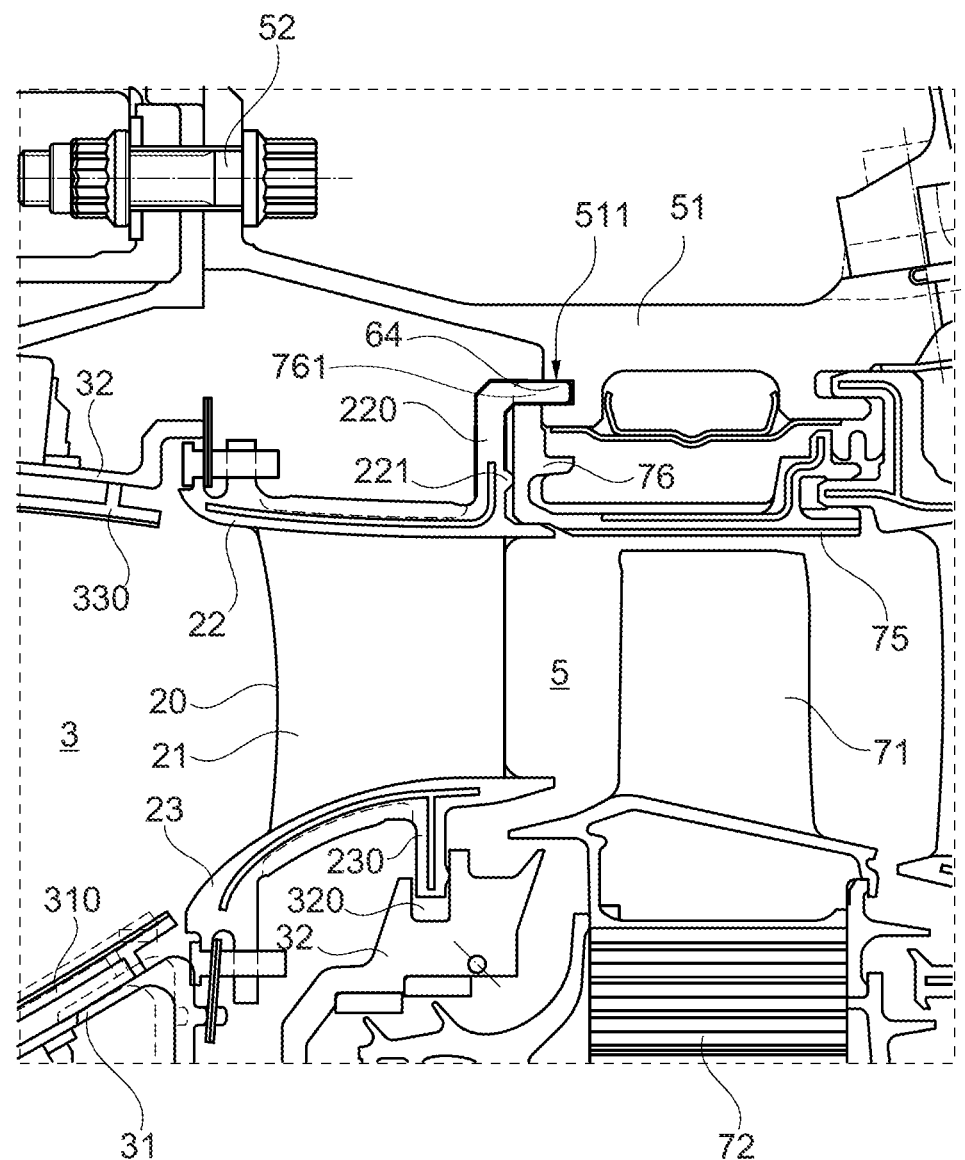
FIG. 3c shows a third exemplary embodiment of a turbine nozzle guide vane segment of a nozzle guide vane ring of stage 1 of a high-pressure turbine, wherein the turbine nozzle guide vane segment is radially fixed directly at a turbine casing.

In an alternative embodiment, the outer platform 22 can be radially fixed inside an axial groove of the turbine casing 51 of the high-pressure turbine by means of at least one hook. In this context, FIG. 3*c* shows an exemplary embodiment that corresponds to the exemplary embodiment of FIG. 3*b*, except for the type of radial fixation of the turbine nozzle guide vane segments 20. According to the exemplary embodiment of FIG. 3*c*, the wall section 220 of the outer platform 22 that extends in the radial direction forms at least one axially extending hook 64, which is fixed at the turbine casing 51 inside an axial groove 511 of the turbine casing 51 extending about the circumferential direction. By arranging the hook 64 in the groove 511, a fixation of the turbine nozzle guide vane segments 20 in the radial direction is realized directly at the turbine casing 51. Here, two hooks 64 per turbine nozzle guide vane segment 20 are provided, for example. Alternatively, a hook 64 that is continuous in the circumferential direction can be provided.

It is to be understood that the groove 511 of the turbine casing 51 is also provided for the radial fixation of the shroud segment 76. For this purpose, the hooks 64 of the turbine nozzle guide vane segment 20 and the hooks 761 of the shroud segment 76 are seated alternating inside the groove 511 of the turbine casing. Due to the turbine nozzle guide vane segment 20 as well as the shroud segment 76 being attached in a common groove 511 of the turbine casing 51, the tolerances between these two components are minimized.

In the embodiment of FIG. 3*c*, a fixation of a turbine nozzle guide vane segment 20 in the circumferential direction can be realized by means of one or multiple pins. A shroud segment 76 can be supported in the circumferential direction at the lateral surfaces of the hooks 64 of the turbine nozzle guide vane segment 20, whereby a separate fixation of the shroud segment 76 by pins can be waived, and a particularly effective embodiment is achieved.

Thus, in the exemplary embodiments of FIGS. 3*a*, 3*b* and 3*c*, a fixation of the turbine nozzle guide vane segments 20 in the radial direction at the outer housing 34, 51 is realized. Correspondingly, any occurring radial loads are guided into the outer housing 34, 51. This leads to the radial tolerances of the arrangement of the turbine nozzle guide vane segment 20 relative to the adjoining structures 75, 76 at different thermal expansions being considerably reduced, since the turbine nozzle guide vane segment 20 as well as the adjoining structures are connected to the outer housing 34, 51.

Figure 4:
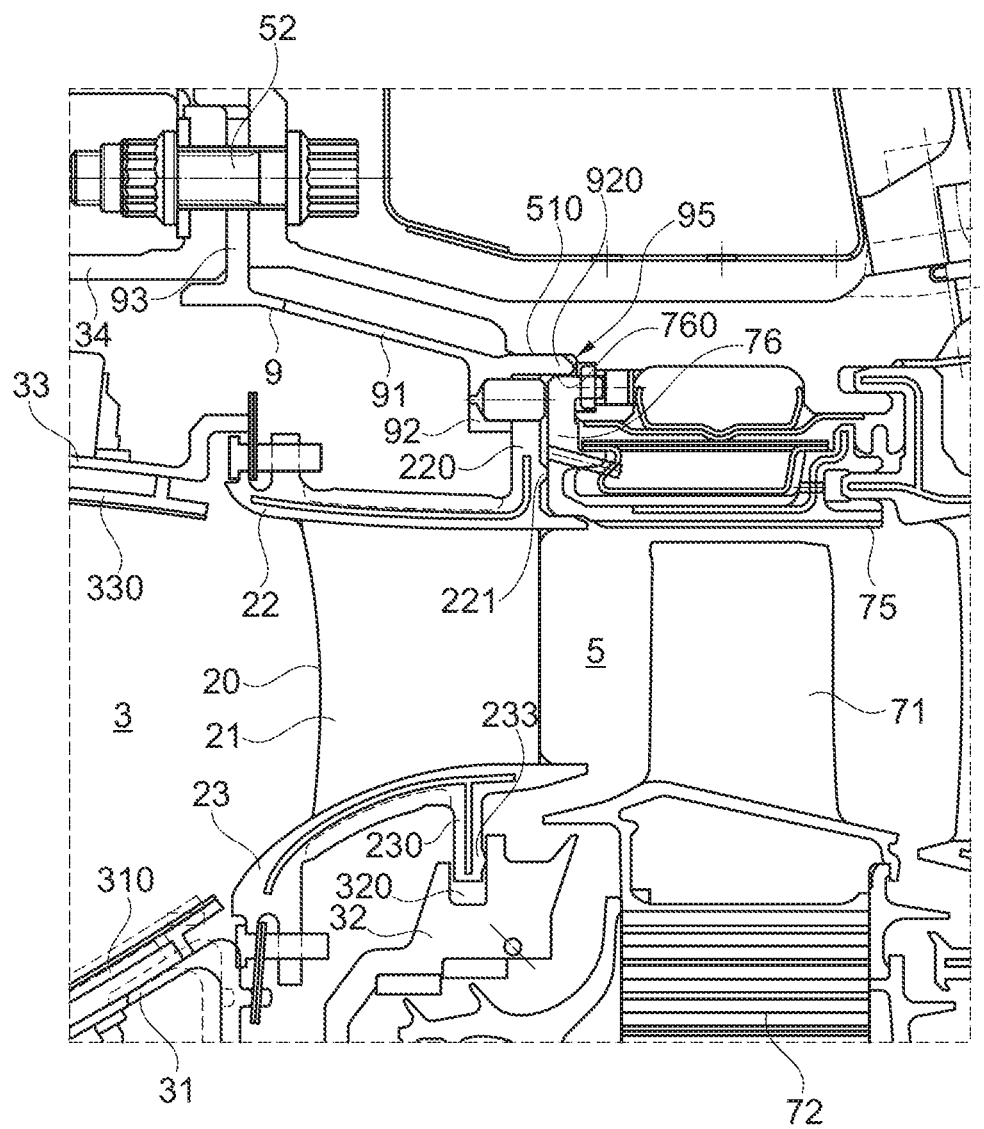
FIG. 4 shows a fourth exemplary embodiment of a turbine nozzle guide vane segment of a nozzle guide vane ring of stage 1 of a high-pressure turbine, wherein the turbine nozzle guide vane segment is radially fixed at a turbine casing by means of a slit guide vane support ring.

FIG. 4 shows an exemplary embodiment in which, unlike in FIG. 3, the turbine nozzle guide vane segments are fixed at the outer housing not directly, but rather via an intermediate structure. Here, the fixation is realized at the turbine casing 51. In the shown exemplary embodiment, this intermediate structure is a guide vane support ring 9. It comprises a first radial wall area 92 in which the guide vane support ring 9 is connected in the described manner to the wall section 220 of the outer platform 22 by means of two pins 62. Further, the support ring 9 comprises a second radial wall area 93 by which the support ring 9 is radially connected in the attachment area 52 to the turbine casing 51 and also to the combustion chamber outer casing 34. A third wall area 91, which connects the two radial areas 92, 93, extends obliquely and thus with an axial directional component between the two radial wall areas 92, 93.

Here, provision is made according to the exemplary embodiment of FIG. 4 that the wall areas 91, 92 are slit, i.e. that they are provided with individual slits and segmented in this way. In this manner, the radial movability is increased if radial displacements of the turbine casing 51 occur.

In this manner, it is facilitated that a connection to the turbine casing 51 is maintained under all operational conditions, for example also in the event that strong thermal movements of the turbine casing 51 occur, and thus the radial relative movements between the turbine nozzle guide vane segment 20, or its outer platform 22, and the adjoining structures 75, 76 are minimized.

Here, according to one advantageous embodiment, the embodiment of the wall areas 91, 92 with slits is realized in combination with a groove-finger connection 95, wherein the outer wall of the groove is formed by the inner wall 510 of the turbine casing 51 and the inner wall of the groove is formed by an outer wall 760 of the structure 76 adjoining the turbine nozzle guide vane segment 20 in the axial direction (shroud segment). The finger 920 of the groove-finger connection 95 is formed by a wall of the first radial wall area 92 that projects axially into the groove and extends radially between its inner and outer wall.

Through the groove-finger connection 95, the guide vane support ring 9 is fixed to the turbine casing 51 in the radial direction. In this manner, a radial fixation of the guide vane support ring 9 to the turbine casing 51 is provided, whereby radial relative movements between the turbine nozzle guide vane segment 20 and the structure adjoining thereto in the axial direction are minimized.

Figure 5:
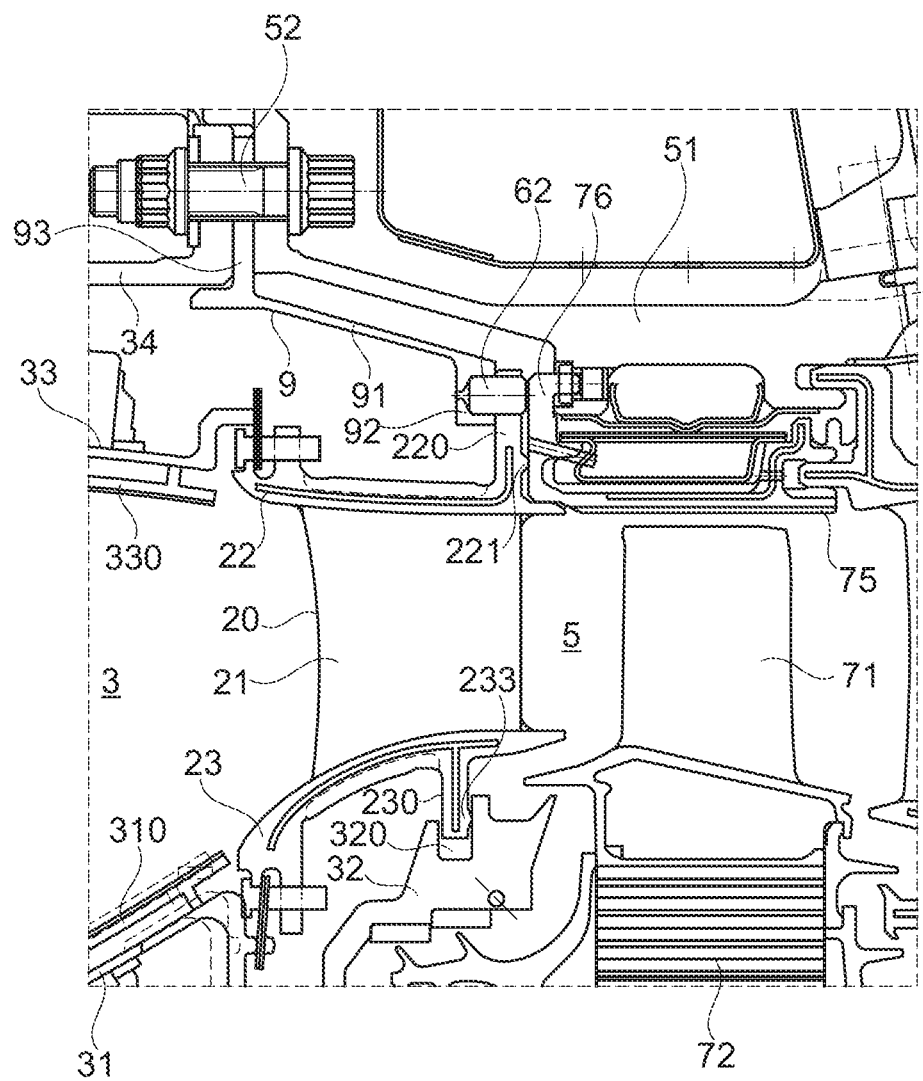
FIG. 5 shows a fifth exemplary embodiment of a turbine nozzle guide vane segment of a nozzle guide vane ring of stage 1 of a high-pressure turbine, wherein the turbine nozzle guide vane segment is radially fixed at a turbine casing by means of a non-slit guide vane support ring.

FIG. 5 shows a further exemplary embodiment that differs from the exemplary embodiment of FIG. 4 with respect to the embodiment of the wall areas 91, 92 of the guide vane support ring 9. While in the exemplary embodiment of FIG. 4 these wall areas 91, 92 are formed in a slit-like manner, they are not provided with slits in the exemplary embodiment of FIG. 5. Further, a groove-finger connection corresponding to the groove-finger connection 95 of FIG. 4 is not present. Small radial relative movements between the guide vane segments 20 and the structures axially adjoining thereat, such as structures 75, 76, are permitted.

Figure 6:
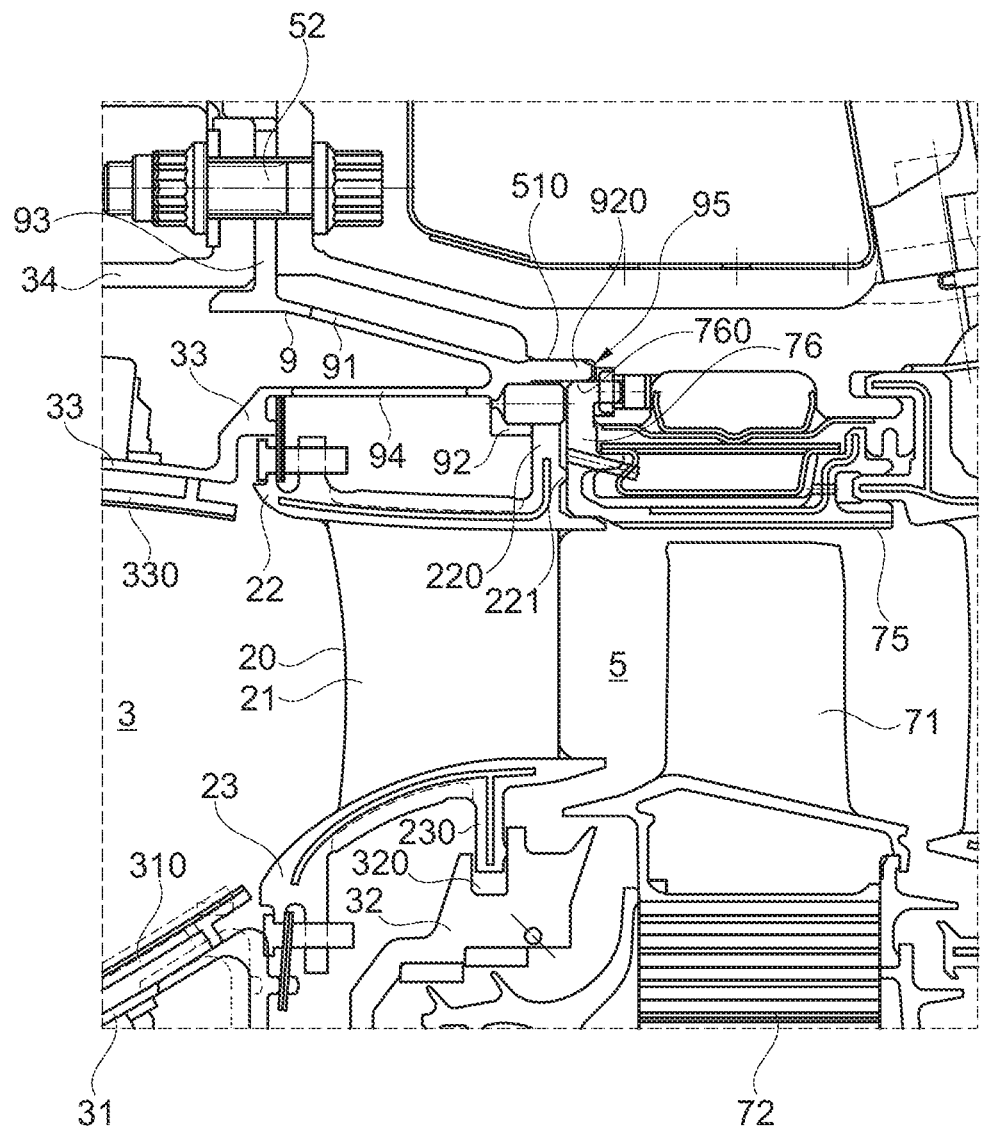
FIG. 6 shows a sixth exemplary embodiment of a turbine nozzle guide vane segment of a nozzle guide vane ring of stage 1 of a high-pressure turbine, wherein the turbine nozzle guide vane segment is radially fixed at a turbine casing by means of a slit guide vane support ring that additionally forms a support arm which is connected to the combustion chamber.

FIG. 6 shows a further exemplary embodiment, in which the turbine nozzle guide vane segments 20 are fixed at the turbine casing 51 not directly, but rather via an intermediate structure 9. The intermediate structure 9 comprises a guide vane support ring 9 corresponding to FIG. 4. In addition, a combustion chamber support arm 94 is provided, which is connected to the combustion chamber outer wall 33 of the combustion chamber 3. Here, the combustion chamber support arm 94 starts at the first radial area 92 of the support ring 9.

By providing a combustion chamber support arm 94, a fixation of the combustion chamber outer wall 33 is provided in a simple manner, without having to provide additional components for that purpose. Here, provision can be made that the combustion chamber support arm 94 as well as the wall area 91 and the radial area 92 are provided with slits to achieve an improved accommodation of radial relative movements.

Figure 7:
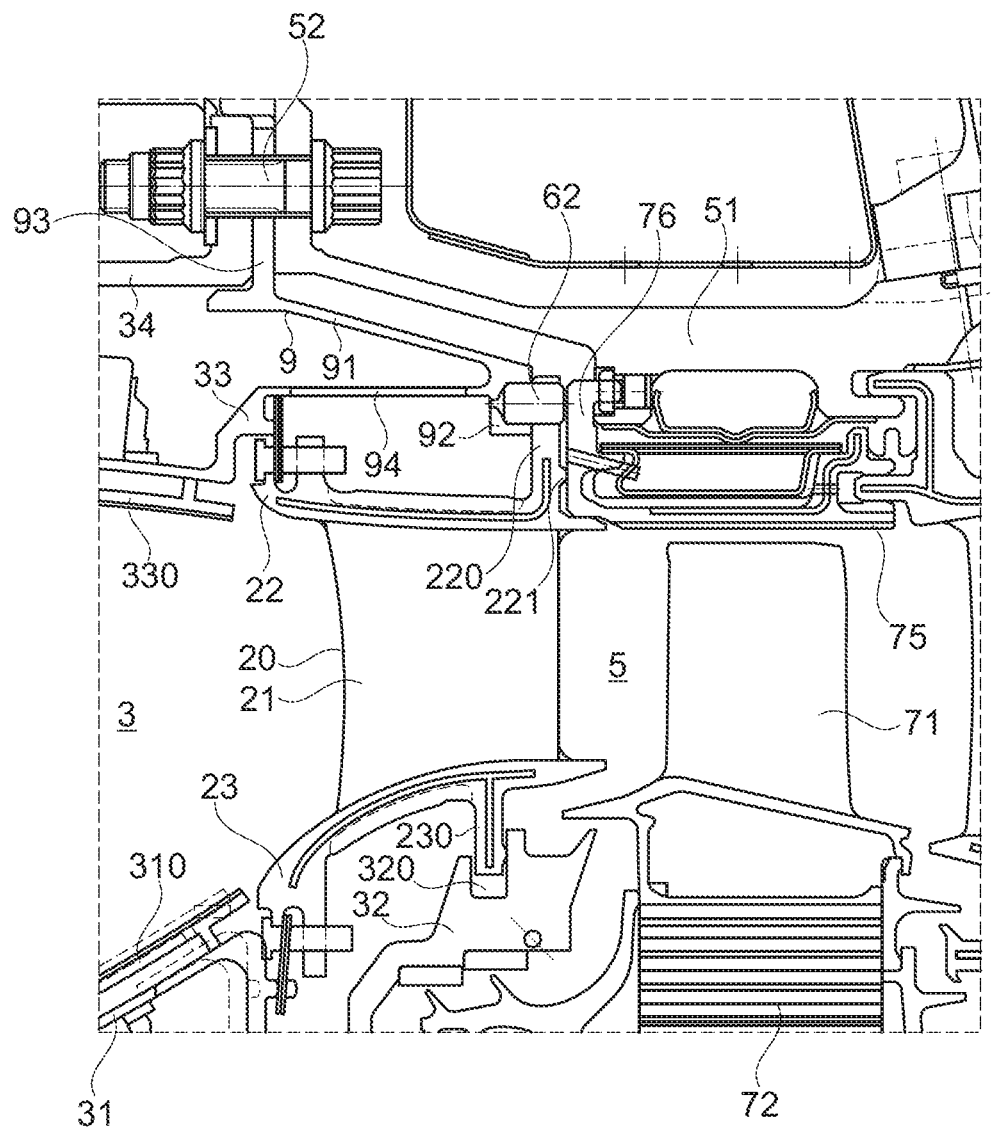
FIG. 7 shows a seventh exemplary embodiment of a turbine nozzle guide vane segment of a nozzle guide vane ring of stage 1 of a high-pressure turbine, wherein the turbine nozzle guide vane segment is radially fixed at a turbine casing by means of a non-slit guide vane support ring that additionally forms a support arm which is connected to the combustion chamber.

FIG. 7 shows an exemplary embodiment that corresponds to the exemplary embodiment of FIG. 6, except for the fact that the wall area 91 and the radial area 92 are formed not in a slit-like, but in a continuous manner, just as is the case with FIG. 5.

The present invention is not limited in its embodiment to the previously described exemplary embodiments. For example, it is pointed out that the concrete shape and embodiment of the guide vanes 21, the outer platform 22 and the inner platform 23 are to be understood merely as examples.

Further, it is to be understood that the features of the individual described exemplary embodiments of the invention can be combined with each other into different combinations. As far as ranges are defined, they comprise all values within these ranges, as well as all partial ranges falling within a range.

The invention claimed is:
1. A gas turbine, comprising:
a combustion chamber including a combustion chamber casing;
a high-pressure turbine including;
a turbine casing including an axial groove with respect to a rotational axis of the gas turbine; the axial groove being defined by two opposing side walls and a connecting base surface and
a first turbine guide vane ring that is arranged downstream of the combustion chamber, wherein the first turbine guide vane ring includes a turbine nozzle guide vane segment, wherein the turbine nozzle guide vane segment includes:
at least one guide vane;
an outer platform;
an inner platform; and
a guide vane hook;
an outer housing, including the combustion chamber casing and the turbine casing, wherein the guide van hook is positioned in the axial groove of the turbine casing to fix the turbine nozzle guide vane segment in a radial direction with respect to the rotational axis, and wherein occurring radial loads are transferred into the outer housing;
a first turbine rotor blade ring arranged downstream from the first turbine guide vane ring and including a rotor blade; and
a structure arranged axially downstream from the first turbine guide vane ring, wherein the structure is an outer boundary of a main flow path of the rotor blade, and wherein the structure is fixed in the radial direction via a portion of the structure being inserted between the two side walls of the axial groove.

2. The gas turbine according to claim 1, further comprising an inner casing of the combustion chamber, wherein the turbine nozzle guide vane segment is supported in an axial direction at the outer housing as well as at the inner casing, wherein occurring axial loads are transferred into the outer housing and the inner casing.

3. The gas turbine according to claim 2, wherein the inner platform includes an inner platform wall that extends inwards in the radial direction and comprises an inner wall sealing edge extending in a circumferential direction with respect to the rotational axis, wherein the inner casing includes a radially extending recess, wherein the inner platform wall is arranged inside the recess so as to be displaceable therein in the radial direction, wherein the recess forms an axial stop collar of the inner casing for the inner sealing edge of the inner platform wall, and thus for the turbine nozzle guide vane segment.

4. The gas turbine according to claim 1, wherein, at the outer platform, the turbine nozzle guide vane segment is axially supported at the structure.

5. The gas turbine according to claim 1, wherein, at the outer platform, the turbine nozzle guide vane segment forms a radially extending outer platform wall that comprises an axially supported sealing edge that extends in a circumferential direction with respect to the rotational axis.

6. The gas turbine according to claim 1, wherein the turbine nozzle guide vane segment is fixed at the outer housing in the radial direction and in a circumferential direction with respect to the rotational axis, and wherein occurring radial and tangential loads are transferred into the outer housing.

7. The gas turbine according to claim 1, wherein the outer housing is formed by the turbine casing and the combustion chamber casing, which are connected to one another.

8. The gas turbine according to claim 1, wherein the turbine nozzle guide vane segment is fixed directly at the outer housing in the radial direction.

9. The gas turbine according to claim 1, wherein the rotor blade is formed without a tip shroud.

10. A method for attaching a turbine nozzle guide vane segment of a gas turbine, comprising:
providing the gas turbine, including:
a combustion chamber including an inner casing;
a high-pressure turbine including:
a turbine casing including an axial groove with respect to a rotational axis of the gas turbine; the axial groove being defined by two opposing side walls and a connecting base surface and
a first turbine guide vane ring that is arranged downstream of the combustion chamber, and wherein the first turbine guide vane ring includes a turbine nozzle guide van segment, and wherein the turbine nozzle guide vane segment includes a guide vane hook;
an outer housing including the turbine casing;
a first turbine rotor blade ring arranged downstream from the first turbine guide vane ring and including a rotor blade; and
a structure arranged axially downstream from the first turbine guide vane ring, wherein the structure is an outer boundary of a main flow path of the rotor blade; and
positioning the guide vane hook in the axial groove of the turbine casing to fix the turbine nozzle guide vane segment in a radial direction with respect to the rotational axis;
fixing the turbine nozzle guide vane segment in a circumferential direction with respect to the rotational axis;
fixing the turbine nozzle guide vane segment in the axial direction at the outer housing and at the inner casing; and
fixing the structure in the radial direction via a portion of the structure being inserted between the two side walls of the axial groove.

11. The gas turbine according to claim 1, wherein the structure is a shroud segment.

12. The gas turbine according to claim 1, wherein the first turbine guide vane ring includes a plurality of turbine nozzle guide vane segments, wherein the structure includes structure hooks, and wherein the guide vane hooks and the structure hooks alternately sit in the axial groove of the turbine housing.

13. The gas turbine according to claim 1, wherein the structure includes an abradable material facing the main flow path.

14. The gas turbine according to claim 1, wherein the turbine guide vane segment is fixed in a circumferential direction with respect to the rotational axis via at least one pin.

15. The gas turbine according to claim 1, wherein the structure is supported by a side surface of the turbine hook in a circumferential direction with respect to the rotational axis and the structure is fixed in the circumferential direction.

* * * * *